United States Patent [19]

Hirano et al.

[11] 4,426,594

[45] Jan. 17, 1984

[54] COMMUTATOR FOR A MOTOR AND METHOD OF MAKING THE SAME

[75] Inventors: Hiroaki Hirano, Miyashiro; Takashi Hondo, Tokyo, both of Japan

[73] Assignee: Sony Corporation, Tokyo, Japan

[21] Appl. No.: 289,879

[22] Filed: Aug. 4, 1981

[30] Foreign Application Priority Data

Aug. 11, 1980 [JP] Japan ............................ 55-110869

[51] Int. Cl.$^3$ ............................ H02K 13/00

[52] U.S. Cl. ............................ 310/233; 29/597

[58] Field of Search ............................ 310/232-237, 310/219, 228, 42; 29/597; 174/138 R, 138 C

[56] References Cited

U.S. PATENT DOCUMENTS

| | | | |
|---|---|---|---|
| 1,865,523 | 7/1932 | Jeppson | 310/236 |
| 2,478,536 | 8/1949 | Koonz | 310/235 |
| 3,996,660 | 12/1976 | Hancock | 29/597 |

FOREIGN PATENT DOCUMENTS

| | | | |
|---|---|---|---|
| 2822239 | 12/1979 | Fed. Rep. of Germany | 310/233 |
| 585569 | 12/1977 | U.S.S.R. | 310/233 |
| 637052 | 10/1979 | U.S.S.R. | 310/233 |

*Primary Examiner*—R. Skudy

*Attorney, Agent, or Firm*—Hill, Van Santen, Steadman & Simpson

[57] ABSTRACT

A commutator for a motor and a method of making the same wherein the motor has a stator and a rotor with a rotary shaft and the commutator consists of a plurality of commutator segments embedded in an insulating body, with each of the commutator segments having contact surfaces for engagement with a brush. The commutator is formed with a number of hemispherical shaped impressions so as to form a rough surface.

A method of manufacturing the commutator comprises embedding a plurality of commutator segments in a body made of insulating material and the step of forming hemispherical impressions in the commutator segments by directing a jet of particles onto the surfaces of the commutator segments with a predetermined pressure so as to provide the desired roughened surface.

5 Claims, 3 Drawing Figures

COMMUTATOR FOR A MOTOR AND METHOD OF MAKING THE SAME

BACKGROUND OF THE INVENTION

1. Field of the Invention

The present invention relates in general to commutators for motors wherein the commutator has a roughened surface. The invention also relates to the method of manufacturing the commutator according to the invention.

2. Description of the Prior Art

Motor commutators according to the prior art utilize oil which is applied to the commutator so as to prevent the generation of fine arcs due to the contact and separation of the brushes to the commutator segments. Such arcing causes surface changes due to oxidation, sulfidation of the contact surface during operation. When oil is coated on the commutator and a thin oil film will be present on the contact surface between the commutator segments and the brush which causes the electrical contact to be deteriorated and disturbed. In prior art commutators so as to avoid this defect, fine concave-convex surfaces have been formed on the surfaces of each of the commutator segments with the concave portions acting as an oil tank while maintaining good electrical contact between the commutator segments and the brush. Generally, the concave-convex surfaces formed on the commutator segments are formed with sandpaper or an abrasive wheel which contacts the commutators surface as they are relatively rotated so as to abrade the surface of the commutator and the segments. Thus, the concave-convex surface on each of the commutator segments of the prior art commutators has been formed as a concave-convex line-shape pattern which extends along the rotational direction to the end and edge of each commutator segment. This results that burrs or fins are formed on the end edge of each commutator segment due to the rotational abrasion. When the motor is driven, the burrs peel off from the commutator segment and cause short circuiting between the commutator segments. Thus, in the prior art, it has been necessary to provide a step in the process of manufacturing so as to remove the burrs from the end edges of the commutator segments. With small motors such as micromotors such a deburring process must be carried out when using a microscope which is very tedious and time consuming and causes great fatigue to a worker which results in the production of such motors being slow and expensive.

SUMMARY OF THE INVENTION

It is an object of the present invention to provide a novel commutator for a motor.

It is another object of the invention to provide a commutator for a motor which is free of the defects of the prior art.

An additional object of the invention is to provide a commutator that can be mass produced cheaply and rapidly.

A further object of the invention is to provide a commutator for use in a motor which can hold oil and serve as an oil tank so as to ensure good electrical contact between the commutator segments and the brush of the motor.

A still further object is to provide a novel method of manufacturing a commutator for a motor.

Yet another object of the invention is to provide a method of manufacturing a commutator that can be used in mass production.

In an aspect of the invention, a commutator for use in a motor having a stator and rotor with a rotary shaft comprises a plurality of commutator segments embedded in an insulating body with each commutator segments having contact surfaces which contact a brush and a number of impressions are formed in each of the commutator segments so as to form a rough surface.

Yet another aspect of the invention is to provide a method for manufacturing a commutator for use in a motor wherein the commutator consists of a plurality of commutator segments which comprises the steps of:

(a) embedding a plurality of commutator segments in a body of insulating material; and (b) forming hemispherical depressions in the surface of the commutator segments with the process of forming such hemispherical depressions accomplishing by applying a jet of particles such as glass on the surfaces of the commutator segments under predetermined pressure.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
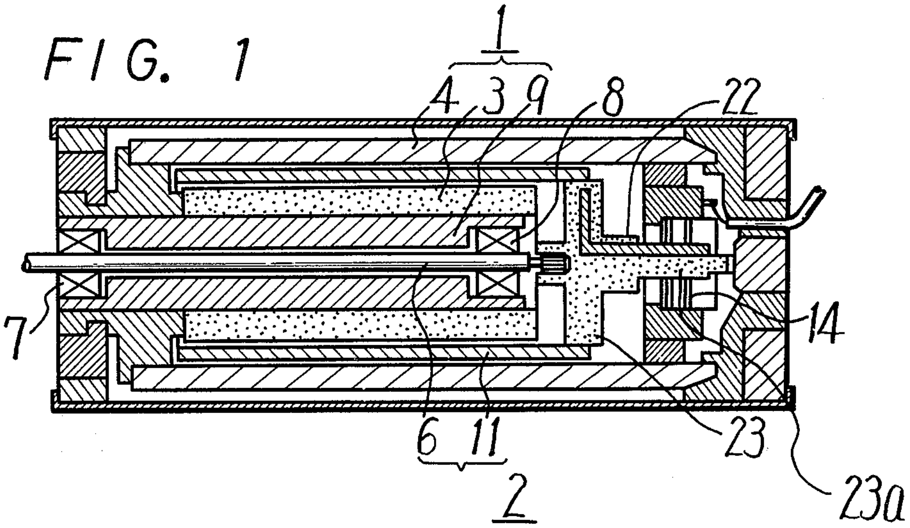
FIG. 1 comprises a cross-sectional view of a motor for explaining the invention.

FIG. 1 illustrates in sectional view a DC motor which has a stator 1 and a rotor 2. The stator consists of field magnets 3 which are cylindrical in shape, a yoke 4 and a bearing box 9 which contains bearings 7 and 8 for rotatably supporting the rotary shaft 6 of the rotor 2. The rotor comprises a commutator 22 which is attached to the rotary shaft 6 of the motor and a coil or winding 11 which is wound on the rotor and is mounted so as to rotate between the field magnets 3 and the yoke 4 of the stator. The commutator 23 has of a plurality as, for example, five commutator bars or segments 22 which are integrally embedded in resin mold body of the commutator 23 and are arranged in an equal angular distance about the center axis of the rotary shaft 6. Each of the commutator segments 22 has its peripheral portion partially exposed on a peripheral segment 22 of the resin mold body of the commutator 23 and the exposed peripheral segments of the commutator segments 22 are located on a common cylindrical surface. In FIG. 1 only one commutator surface is illustrated. A brush 14 is supported by the stator and engages the commutator 22 as the rotor rotates.

In a motor with commutators of this form, in order to prevent generation of fine arcs due to the contact and separation of the commutator segments with the brush 14 which cause oxidation and sulfidation of the contact surfaces of the commutator segments, an oil film is coated on the commutator 23 and electrical contact between the brushes and the commutator segments 22 will be deteriorated and disturbed. In order to avoid this result, commutators with fine concave-convex surfaces have been formed in prior art on the surface of each of the commutator segments wherein the concave surfaces serve as oil tanks while maintaining good electrical contact between the brushes and the segments 22. Generally, the concave-convex surfaces on the surfaces of the commutator segments 22 have been formed with a sandpaper or abrasive wheel which engages the commutator surfaces and wherein the commutator segments and abrasive wheel are rotated relative to each other so as to abrade the surface of the segments 22. Such concave-convex surfaces have formed a line-shaped pattern which extends along the rotational direction to the end and edges of each of the commutator segments 22 so that burrs or fins are formed on such edges of each commutator segment due to the rotational abrasion. When such motors are driven, the burrs peel off from the commutator segments and result in short circuiting between the commutator segments. Thus, in prior art motors of this type, it has been necessary to remove the burrs from the end edges of the commutator segments 22 before use. Such removal of the end burrs must be carried out under a microscope when the motor is a micro-motor that is very small in size. Thus, DC motors are very tedious and slow to manufacture and result in great fatigue for workers which obstructs the mass production of such motors.

In the present invention, a commutator for use in a DC motor is provided which is free from the defects of the prior art and suitable for mass production and has the function so as to hold sufficient oil and to be an oil tank and also assure that good electrical contact of the commutator segments is maintained with the brush.

Figure 2:
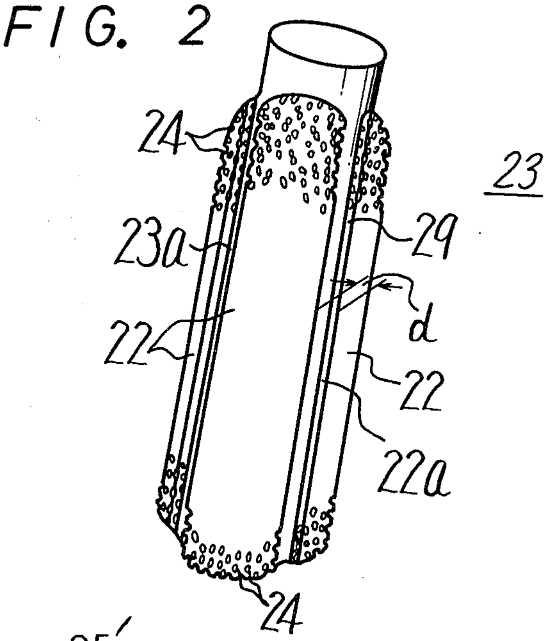
FIG. 2 is a perspective view illustrating in an enlarged scale a commutator for a motor according to the invention.

An enlarged view of the commutator of the invention is illustrated in FIG. 2. The commutator 23 may be for a small size DC motor such as described relative to FIG. 1 and can be used in place of the commutators 10 of the prior art.

In the invention, a plurality of commutator segments 22 as, for example, five commutator segments in a particular example are made of electrically conducting material and are connected in a suitable fashion to the windings 11 of the motor and are embedded in the commutator 23 which may be made of a resin mold body of cylindrical shape. The commutator 23 may be made of a thermal plastic resin mixed with glass fibers such as polybutyral terephtalate during a mold forming process so as to form the commutator 23. The commutator segments 22 are placed so as to be on the outer surface of the commutator so that they can engage the brush 14 as shown in FIG. 1. The outer peripheral surface of each commutator segment 22 which engages the brush is formed with a rough surface by providing a plurality of impact impressions 24 of hemispherical shape which are formed by directing a jet of small particles such as spherical particles onto the surface of each commutator segment 22.

Figure 3:
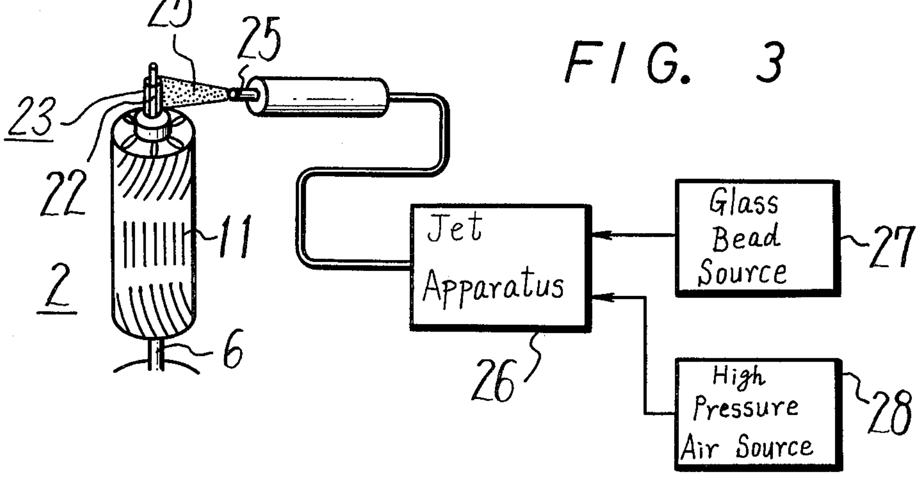
FIG. 3 is a schematic diagram illustrating the method for constructing the invention.

As shown in FIG. 3, a method illustrating the manner in which the hemispherical impact impressions 24 in the surface of the commutator segments 22 are formed. The commutator 23 is formed by embedding a plurality of the commutator segments in the rotor 2 of the motor and then a number of small particles such as spherical particles made of, for example, glass beads which are chemically stable and have suitable hardness are directed in a jet stream through a nozzle 25 onto the peripheral surface of the commutator segments 22. The impact impressions 24 of hemispherical shapes are thus formed. A jet apparatus feeds spherical particles 25′ such as glass beads from a glass bead source 27 to the nozzle 25 under a predetermined pressure as, for example, 1 $Kg/cm^2$ by high pressure air which is applied to the apparatus 26 from a high pressure air source 28.

By jetting a number of the spherical particles 25′ onto the commutator segments 22, a number of hemispherical shaped impact impressions 24 each of which are substantially hemispherical in shape are formed on the peripheral surface of each segment 22. It is important to note that the size and shape of the hemispherical impressions 24 depends on the size and shape of the spherical particles 25′ which impinge on the surface of the commutator segments 22. In the present invention, the diameter of each of the spherical particles 25′ is selected to be smaller than the distance or width d of the slit 29 between the adjacent commutator segments 22. In a specific example, if the width d of each slit 29 is about 0.15 mm, the diameter or particle size of the spherical particles 25′ which are used to particle blast the surface of the segments 22 and to form the impressions 24 is selected to be about 0.1 mm.

Spherical particles 25′ for forming the hemispherical impressions 24 may be glass beads. By way of example, such glass beads may be made of a material that contains 71.7 weight percent of $SiO_2$, 1.67 weight percent of $Al_2O_3$, 0.12 weight percent of $Fe_2O_3$, 8.72 weight percent of CaO, 2.81 weight percent of MgO, 13.9 weight percent of $Na_2O$, 0.97 weight percent of $K_2O$, and 0.03 weight percent of $B_2O_3$.

The impact impressions 24 formed by impact of the spherical particles 25′ will also be formed on the end surfaces 22*a* of each of the segments 22 facing the slit 29 but according to the invention burrs or fins will not be formed. In the prior art, in contrast to the present invention when the line-shaped concave-convex portions were formed along the rotational direction on the surface of each segments the burrs were thin and unstable due to lack of mechanical strength which caused a shorting of the commutator segments.

According to the invention, on the other hand, the rough surfaces formed in the surfaces of the segment by using impact of spherical particles thin burrs will not be formed along the end edges of each segment.

In the invention after the spherical particles have been impacted on the segments 22, the spherical particles will adhere to the commutator but they can be easily removed by merely rinsing the commutators.

The commutators including the segments which have the rough surfaces formed by the impact of the spherical particles on the portions which will be in contact with the brush are coated with oil and used in the motor illustrated in FIG. 1.

The commutator of the invention formed as described above assures good electrical contact between the brushes and maintains the oil in the hemispherical openings and prevents arcs from being generated.

The formation of burrs or fins are avoided due to the impact of the spherical particles and thus the burr removing step of the prior art is not required. Thus, mass production of the motor or commutator is substantially increased according to the invention.

Also, according to the present invention, the size and depth of the impact impressions can be desirably selected by suitably selecting the size shape and other characteristics of the spherical particles which are impacted onto the commutator segments and by selecting the impact pressure of the spherical particles on the commutators. This assures that the optimum rough surface or concave-convex surface will be formed on the commutator depending upon the size of the segments, the distance between adjacent segments and the other characteristics.

Although the invention has been described with respect to preferred embodiments it is not to be so limited as changes and modifications can be made which are within the full intended scope of the invention as defined by the appended claims.

We claim as our invention:

1. A commutator for use in a motor having a stator and a rotor with a rotary shaft, said commutator consisting of a plurality of commutator segments attached to an insulating body, each of said commutator segments having a contact surface which is contacted by a brush, said commutator being characterized in that a number of randomly spaced hemispherical impressions are provided on each of said commutator segments to form a rough surface thereon.

2. A commutator for use in a motor as claimed in claim 1, wherein said number of impressions are formed on at least the contact surface of each of said commutator segments.

3. A commutator for use in a motor as claimed in claim 2, wherein the diameter of each of said hemispherical impressions is smaller than the distance between adjacent commutator segments.

4. A commutator for an electric motor with brushes comprising a cylindrical-shaped insulating body, a plurality of spaced electrical conducting commutator segments attached to said insulating body and each segment spaced from adjacent segments by a distance "d", and a plurality of randomly spaced generally hemispherical depressions formed in the outer brush engaging surfaces of said commutator segments.

5. A commutator according to claim 4 wherein the diameters of said hemispherical depressions is less than "d".

* * * * *